Oct. 28, 1952  C. BANCROFT  2,615,727
STEERING MECHANISM FOR THREE-WHEEL VEHICLES
Filed Sept. 15, 1949  2 SHEETS—SHEET 1

INVENTOR.
CHARLES BANCROFT
BY
Kenyon & Kenyon
ATTORNEYS

Oct. 28, 1952      C. BANCROFT      2,615,727
STEERING MECHANISM FOR THREE-WHEEL VEHICLES

Filed Sept. 15, 1949      2 SHEETS—SHEET 2

INVENTOR.
CHARLES BANCROFT
BY Kenyon & Kenyon
ATTORNEYS

Patented Oct. 28, 1952

2,615,727

UNITED STATES PATENT OFFICE 2,615,727

STEERING MECHANISM FOR THREE-WHEEL VEHICLES

Charles Bancroft, New Canaan, Conn.

Application September 15, 1949, Serial No. 115,831

5 Claims. (Cl. 280—87)

This invention relates to a novel tricycle combining to a considerable degree the roadability and relative constructional simplicity of a motorcycle with the load carrying ability, convenience and comfort of an automobile.

Although called a tricycle because it has three wheels, this new vehicle is more in the nature of a motorcycle in that it has three substantially equally spaced wheels positioned one behind the other. When carrying a transversely balanced load and proceeding in a straight line, these three wheels are aligned with each other. The front and rear wheels are pivotally mounted so that they may be steered to steer the vehicle. When these wheels are simultaneously steered in opposite directions, the vehicle follows a curve while pivoting about the middle wheel.

The middle wheel is mounted so it always points straight ahead but it is laterally shiftably connected to the tricycle so it may shift from alignment with the front and rear wheels to accommodate an unbalanced load and hold the vehicle against tilting. When the vehicle is steered in a curve as described above, there are no forces available to shift this middle wheel because the vehicle goes in a curve while merely pivoting on this middle wheel. But when the front and rear wheels are steered in a direction causing an oblique motion of the tricycle respecting the middle wheel, guiding forces are available to shift this middle wheel in a direction opposite the oblique motion. With the middle wheel working through a suspension that not only is shiftable as described but which also applies upward force to the vehicle as the middle wheel moves up and down relative to the vehicle, the described shifting functions to tilt the tricycle in the direction of the oblique motion.

When steering of the front and rear wheels is effected other than simultaneously in opposite directions and for equal angularities, the described oblique motion is obtained. Thus by steering either the front or the rear wheel only or by steering both the front and rear wheels in the same direction or in opposite directions but by unequal amounts relative to each other, oblique motion is obtained respecting the middle wheel. This provides the middle wheel shifting force whenever the vehicle is in motion.

When a vehicle constructed as described is provided with passenger seats arranged side by side it will normally operate in an inherently unbalanced condition excepting when both riders are of equal weight and are sitting in exactly the same position respecting the center line of the vehicle. Normally an unbalanced condition will prevail. The degree of unbalancing is normally too great to be compensated for by the driver shifting his position as he does in the case of a motorcycle. With the present invention the driver balances the vehicle by steering one or both of the front and rear wheels to cause the vehicle to move obliquely respecting the middle wheel in a direction opposite the unbalancing load. This shifts the middle wheel so it applies through its suspension an upward force to the vehicle offset from the front and rear wheels and more or less in line with and beneath the unbalancing load. By proper steering, the middle wheel is shifted to a proper position to completely counterbalance an unbalancing load. Any tendency for the vehicle to move obliquely from its intended path of travel is overcome by steering the front and rear wheels simultaneously in opposite directions as required to overcome the deviation.

The vehicle may be caused to negotiate a curve by simultaneously steering the front and rear wheels in opposite directions. With the middle wheel offset this no longer causes pivotal action but causes oblique motion relative to the middle wheel. Therefore the middle wheel moves more or less so as to tilt the vehicle in the manner a motorcycle is tilted in negotiating a curve. The degree of tilt may be controlled by negotiating the curve while steering the front and rear wheels unequally as required to further control the shifting position of the middle wheel.

The necessary steering control is provided by furnishing the operator of the device with one means for simultaneously steering the front and rear wheels in opposite directions and with another means for steering either or both of these wheels as required to obtain the prescribed oblique motion respecting the middle wheel. Separate steering controls may be provided but it is preferred to combine them in the form of one control which the operator of the device may manipulate in a manner familiar to motorcycle operators. Thus the control may be arranged to rotate to obtain the simultaneous steering of the front and rear wheels and so the control may be depressed on one side or the other to regulate the tilting effect obtained by shifting of the middle wheel.

A motorcycle operator is accustomed to turning the handle bars to steer and to press down on one or the other of the handle bars to throw his weight into the vehicle to regulate the amount of tilt. The steering controls of the present invention may be designed to operate along the same lines.

A specific example of the present invention is illustrated by the accompanying drawing and described hereinbelow for the purpose of explaining the principles and operation of the invention.

Figure 1:
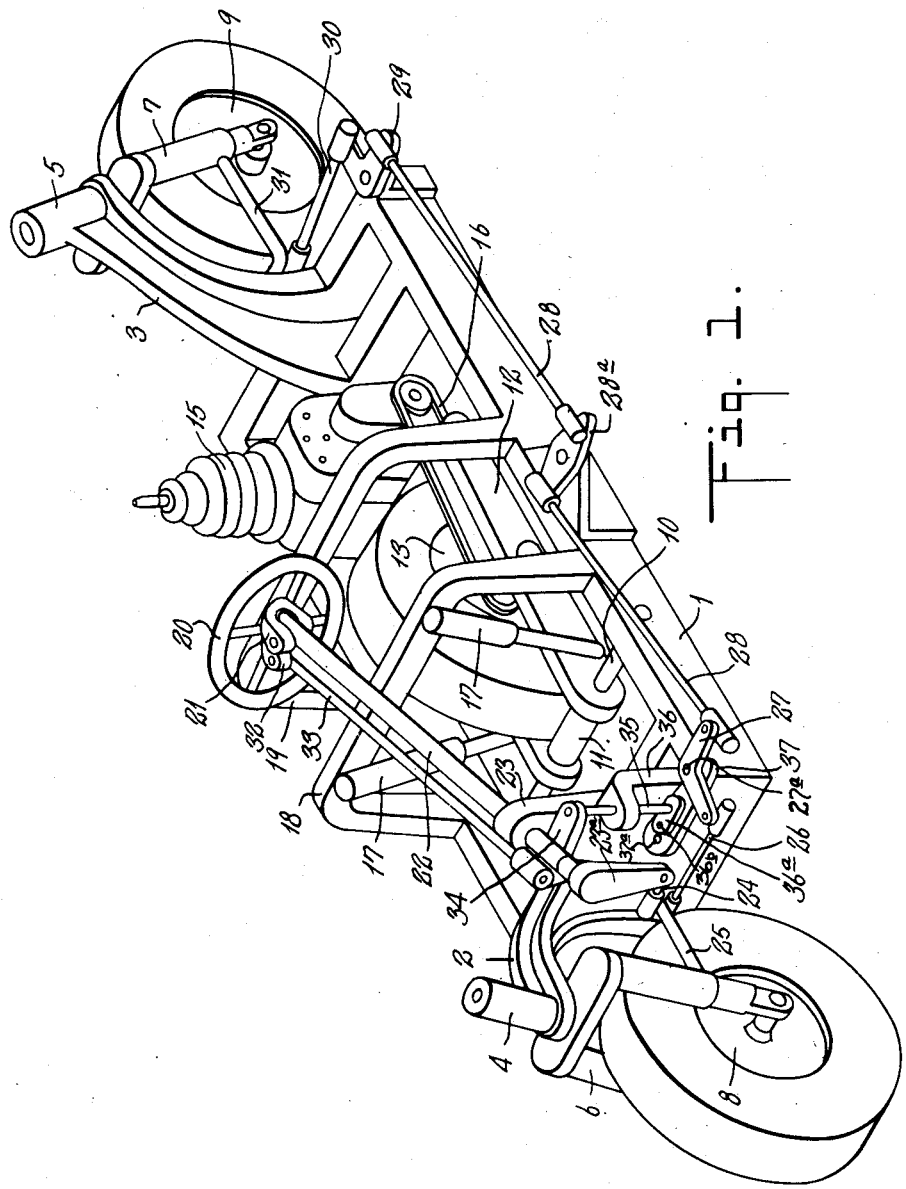
Fig. 1 is a perspective view of the vehicle with the body removed to expose the chassis.
Figure 3:
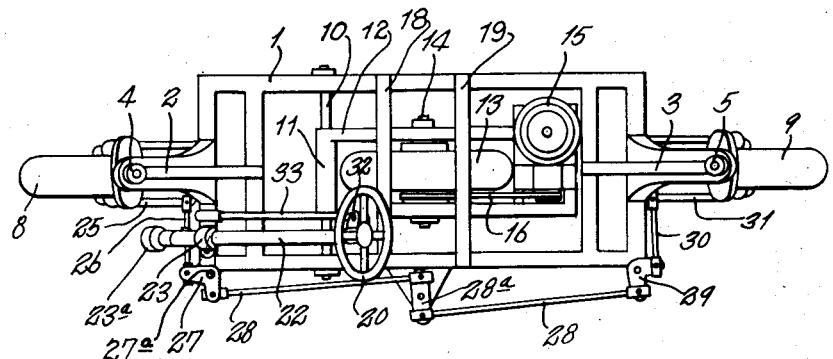
Fig. 3 on a smaller scale shows a top view of Fig. 1.
Figure 2:
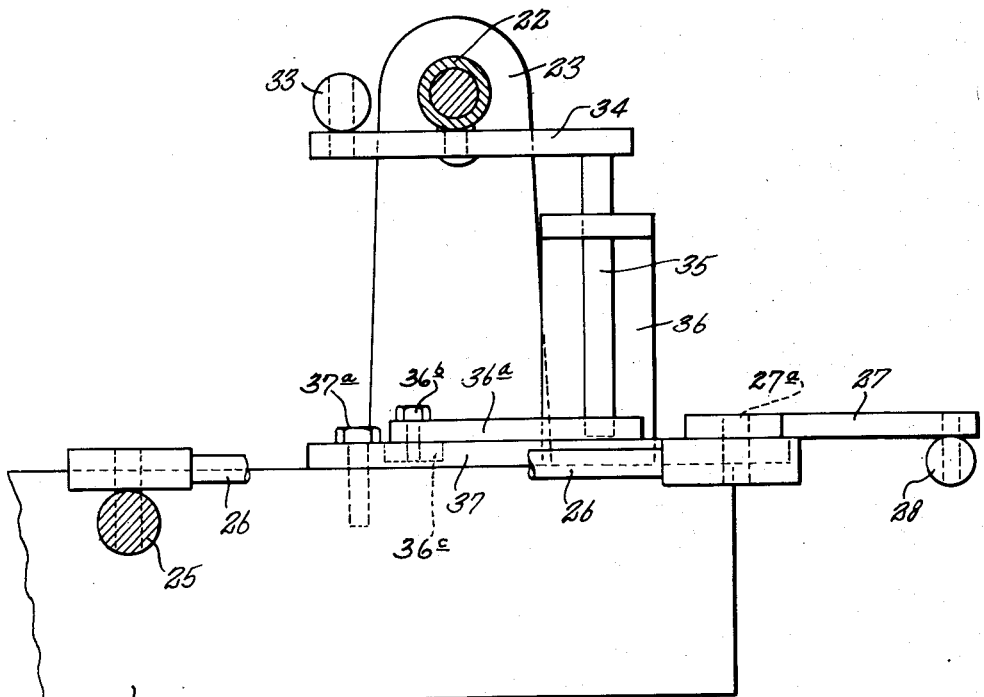
Fig. 2 is a front view of certain details of the steering mechanism with the parts shown on a considerably enlarged scale.

Before analyzing these drawings, it is appropriate to explain that the present invention is for the purpose of providing a small compact vehicle which may carry, for example, two passengers side by side in relative comfort. The body may be constructed in a streamlined manner with upholstered seats protected by an appropriate cowl and windshield. A competent body designer would be confronted with no real problems so the body details are not disclosed. Only the chassis is shown.

As illustrated the chassis has a generally rectangular frame 1 having a front upwardly and forwardly curved cantilever 2 and a rear upwardly and backwardly curved cantilever 3 with their respective free ends provided with bearings 4 and 5 respectively. The front bearing 4 pivotally mounts a fork 6 and the rear bearing 5 pivotally mounts a fork 7, and these forks respectively mount the front wheel 8 and the rear wheel 9.

The forks 6 and 7 may have spring suspensions following the general principles of motorcycle design respecting comparable parts. The bearings 4 and 5 pivotally connect the wheels 8 and 9 to the frame 1 so these wheels may be steered.

The central portion of the frame 1 is generally open. Its sides are spanned right angularly by a transverse shaft 10. This shaft 10 mounts a bearing 11 that slides on the shaft so the bearing is laterally shiftable. The bearing 11 may also rotate or turn on the shaft 10. From this bearing 11 a generally horizontal sub-frame 12 extends backwardly in the form of two laterally spaced arms between which the middle wheel 13 is journaled by a transverse axle 14. The assembly under description is designed so that the middle wheel 13 as nearly as possible contacts the road exactly midway between the points of contact with the road made by the front and rear wheels 8 and 9. This middle wheel 13 may move up and down by swinging action of the sub-frame 12 about the shaft 10 and this middle wheel 13 may also laterally shift respecting the frame 1 by sliding action of its mounting bearing 11 along the shaft 10. This middle wheel is arranged to point straight ahead longitudinally respecting the frame 1 and respecting the steering front and rear wheels when they are pointed straight ahead.

Motive power for this tricycle is provided by an engine 15 mounted on a portion of the sub-frame 12 overhanging behind the wheel 13. This motor 15 is shown in driving connection with the wheel 13 through a belt or chain drive 16. The engine 15 may be provided with a gear box and a clutch and other accessories commonly used in the case of automotive vehicles. Since the engine 15 overhangs the wheel 13, the weight of the engine tends to rock the sub-frame 12 about the axle 14 to thus apply upward force to the shaft 10 and hence to the frame 1. In addition compression spring connections 17 may be used to increase the support the wheel 13 gives the frame 1. These connections have lower ends connected to the side arms of the frame 12 and their upper ends pivoted in a suitable manner to a bridge 18 arching over the space between the side bars of the main frame 1. A second bridge 19 is also illustrated so that these bridges may be used in connection with the mounting of the body and particularly respecting the necessary cushions for the two occupants of the device. These spring connections 17 are arranged to permit the lateral shifting of the sub-frame.

A steering and balancing control is provided by a steering wheel 20 that can be both rotated and transversely rocked. This steering wheel connects through a rocking fork 21 with a steering column 22 that is mounted by a bracket 23 extending upwardly from the front end of the frame 1. The lower end of this steering column carries a one-armed lever 23a connected by a link 24 with a steering lever 25 extending backwardly from the front fork 6. This steering lever or arm 25 is connected by a link 26 with one arm of a bell crank 27 having its other arm connected by links 28 with one arm of a similar bell crank 29 through which motion is transmitted from its other arm to a link 30 connected with the steering arm 31 of the back fork 7. A two-armed rocker lever 28a is interposed between the links 28 so that the proper motion is transmitted to the rear steering arm 31. As the steering control has been described so far, rotation of the steering wheel 20 turns the front and rear wheels in opposite steering direction by equal amounts.

A short lever 32 extends from the rocking fork 21 so that transverse rocking of the wheel 20 rocks this lever 32. Rocking of this lever 32 in turn reciprocates the rod 33 connected to it and extending downwardly generally parallel to the steering column 22. The lower end of this connecting rod 33 is connected to a one-armed lever 34 fastened to a vertical shaft 35 journalled in a bracket 36 extending upwardly and forwardly from the frame 1. The arrangement is such that swinging of the lever 34 turns the shaft 35. The lower end of this shaft 35 has a short lever 36a fastened to it and suitably connected so that when it is swung by the shaft 35 it swings a lever 37 mounted upon the frame 1 at one end and with its other end pivotally mounting the previously mentioned bell crank 27.

In connection with the above, Fig. 1 shows in detail that the lever 37 is pivoted at 37a to the frame 1 and that the short lever 36a is connected at 36b to swing the lever 37. The connection at 36b may be carried out in the prior art manner used when oppositely pivoted levers must be interconnected, as by having the connection 36b comprise a downwardly extending pin fitting slidably in a slot 36c formed in the lever 37 and extending radially from its pivot point 37a. The bell crank 27 is pivoted at 27a on the swinging end of the lever 37 so that swinging of the latter shifts the steering coordination between the front and back wheels. The lever 28a reverses the effect so that swinging of the lever 27 permits the front and back wheels respectively to point in the same general direction and generally parallel to each other with the frame 1 obliquely or angularly positioned respecting this direction, when the road friction is equal for both wheels and the steering wheel 20 is rotatively unrestrained.

Now it can be seen that when the steering wheel 20 is transversely rocked the bell crank 27 is displaced forwardly or backwardly. When the steering wheel 20 is not simultaneously rotated the front wheel is held against steering and the rear wheel only is steered. The steering control effected is in a direction causing oblique motion of the moving vehicle respecting the wheel 13 when the vehicle is moving. Furthermore the oblique direction is in the direction of the downward tilt of the wheel 20.

In operation, the operator of the vehicle is in full control of both direction and balance. This full control prevails even though the load is unbalanced on the frame 1, as for example by reason of the driver being unaccompanied by a passenger and sitting on the far left respecting the frame. With the vehicle in motion a motorcycle operator would naturally try to balance the motorcycle by bearing down on the right hand handle bar and when this same reflex action is applied to the steering wheel 20 it steers the device in a right oblique respecting the wheel 13 so that the latter is forced to a left-hand position by the guiding force between it and the road. Then the sub-frame of the middle wheel automatically applies upwardly directed force to the left-hand side of the main frame 1 so as to balance the device. As in the case of a motorcycle, the effect will be for the vehicle to start to drift to the right side of the road and the motorcyclist reactions would cause a steering of the wheel to the left. With the present device such steering overcomes the right-hand drift.

It is now obvious that an experienced motorcyclist would have little difficulty in steering this vehicle. With the present invention the gear ratio between the steering wheel 20 and the steering wheels of the illustrated device approximate a unity ratio so that the feel is very much like that of motorcycle handle bars. Full steering control is effected by restricted rotation of the steering wheel 20 and this restricted rotation in turn permits the simplified linkage illustrated to operate. Respecting the control obtained by tilting or rocking of the steering wheel, the operator, if used to a motorcycle, will find it possible automatically by normal reflex or instinctive action on his part to have full control respecting both steering and balancing. This applies to the negotiation of curves because rotation of the steering wheel 20 when rocking in the manner familiar to a motorcyclist's handle bar operation automatically causes curving and banking of the vehicle with proper coordination.

In some instances it may be desired to provide the operator of the vehicle with power boosters for applying the force the control motions require. A power operated device under the control of suitable automatic equipment may be used to shift the middle wheel 13 as required to establish balance. Such refinements may prove desirable in certain instances but at the present time it is considered preferable to arrange the middle wheel so that by proper steering of the steering wheels the vehicle is caused to move obliquely so that the rolling action between the middle wheel and the road forces the middle wheel to shift in the desired direction.

Motorcycles have been equipped with either skids or small wheels that are laterally spaced from the center line to hold the vehicle up when not moving or when going too slowly to balance properly. These devices are retractible so they may be moved out of the way when they are not needed. Such devices may be used for the same purpose in the case of the present invention. Wheels are preferred and preferably two are used so there is a wheel on both sides of the center line. The wheels may retract in the usual manner with the retracting and lowering operator arranged handily for the driver of the tricycle.

I claim:

1. A tricycle including a frame supported by three substantially equally spaced wheels positioned one behind the other with the front and rear wheels having means by which they are pivotally connected to the frame so they may be steered to steer the tricycle and with the middle wheel having means by which it is laterally shiftably connected to the frame so it may be shifted laterally to support the frame on one side or the other of the front and rear wheels, and a steering system having means for steering said front and rear wheels in directions causing curving of the tricycle pivotally about said middle wheel and means for steering at least one of said front and rear wheels in a direction causing oblique motion of the tricycle respecting said middle wheel, the latter being connected to the frame by its said means so it always points longitudinally thereof and is caused to shift laterally thereof by said motion.

2. A tricycle including a frame supported by three substantially equally spaced wheels positioned one behind the other with the front and rear wheels having means by which they are pivotally connected to the frame so they may be steered to steer the tricycle and with the middle wheel having means by which it is laterally shiftably connected to the frame so it may be shifted laterally to support the frame on one side or the other of the front and rear wheels, and a steering system having means for steering said front and rear wheels in directions causing curving of the tricycle pivotally about said middle wheel and means for steering at least one of said front and rear wheels in a direction causing oblique motion of the tricycle respecting said middle wheel, the latter being connected to the frame by its said means so it always point longitudinally thereof and is caused to shift laterally thereof by said motion, said middle wheel connecting means including a suspension system permitting vertical motion between said frame and middle wheel and continuously applying upward force to said frame from said wheel with the application location of said force to said frame laterally shifting with lateral shifting of said middle wheel.

3. A vehicle including a plurality of wheels located one behind the other in substantial alignment with each other longitudinally respecting the vehicle, a wheel located between the first-named wheels and aligned longitudinally respecting the vehicle, means for connecting the first-named wheels pivotally to said vehicle so that they may be turned to steering positions relative to said vehicle, means for steering said front and rear wheels in directions causing swerving of the vehicle pivotally about the middle wheel, means for connecting the second-named wheel to said vehicle so that it may be shifted laterally relative to said vehicle, and means for turning the first-named wheels to respectively different steering angles relative to said vehicle and cause lateral shifting of said second-named wheel relative to said vehicle when said vehicle is moving.

4. A vehicle including a main frame, a subframe, means for interconnecting said frames so that they are substantially immovable longitudinally and are shiftable laterally respecting each other, an intermediate wheel connected to said subframe and aligned longitudinally respecting said frames, front and rear wheels pivotally steeringly connected to said main frame in front of and behind said subframe substantially in alignment with each other longitudinally respecting said main frame, means for steering said front and rear wheels in directions causing swerving of the vehicle pivotally about the middle wheel, and means for oppositely steering said front and rear wheels to respectively different steering angles relative to said main frame.

5. A vehicle including a main frame, a subframe, means for interconnecting said frames so that they are substantially immovable longitudinally and are shiftable laterally respecting each other, an intermediate wheel connected to said subframe and aligned longitudinally respecting said frames, front and rear wheels pivotally steeringly connected to said main frame in front of and behind said subframe substantially in alignment with each other longitudinally respecting said main frame, means for steering said front and rear wheels in directions causing swerving of the vehicle pivotally about the middle wheel, and means for oppositely steering said front and rear wheels to respectively different steering angles relative to said main frame, said vehicle further including means for biasing said main frame upwardly from said subframe.

CHARLES BANCROFT.

REFERENCES CITED

The following references are of record in the file of this patent:

UNITED STATES PATENTS

| Number | Name | Date |
|---|---|---|
| 595,490 | Montgomery | Dec. 14, 1897 |
| 969,593 | Blalock | Sept. 6, 1910 |

FOREIGN PATENTS

| Number | Country | Date |
|---|---|---|
| 381,681 | Italy | July 18, 1940 |